C. D. McLEAN.
INSTANTANEOUS HEATER.
APPLICATION FILED SEPT. 22, 1919.
1,355,838.
Patented Oct. 19, 1920.
2 SHEETS—SHEET 2.
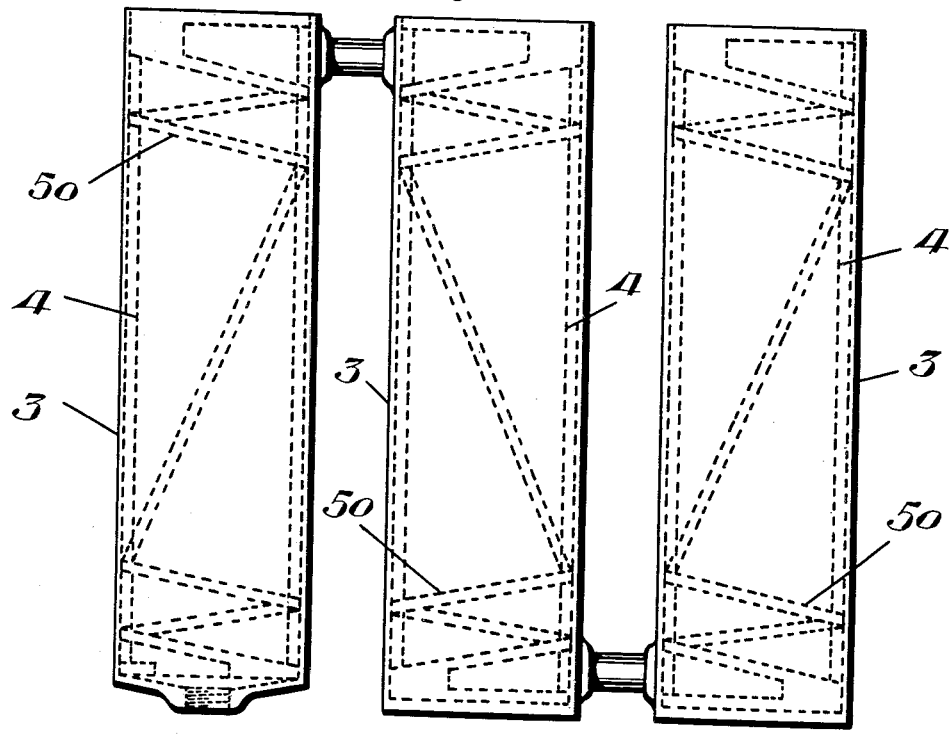
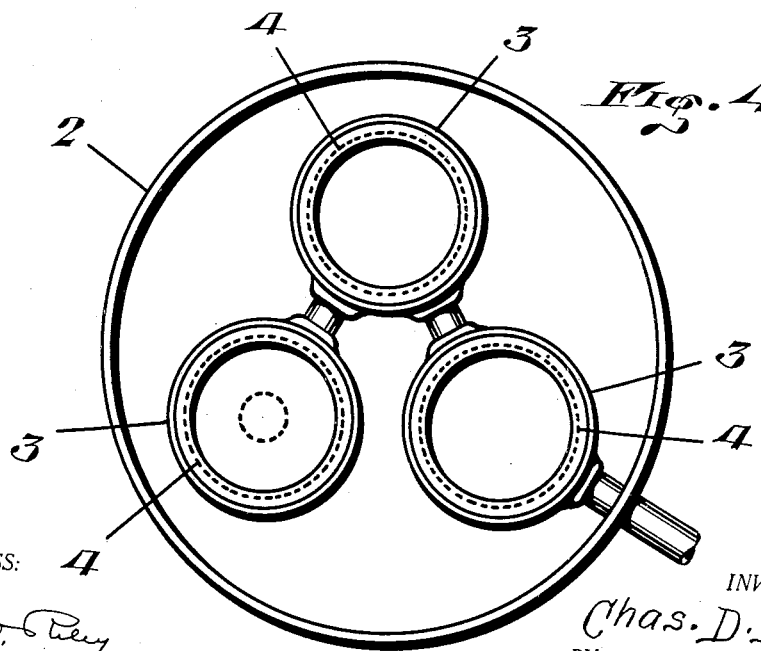
WITNESS:
INVENTOR.
Chas. D. McLean
BY
ATTORNEY.

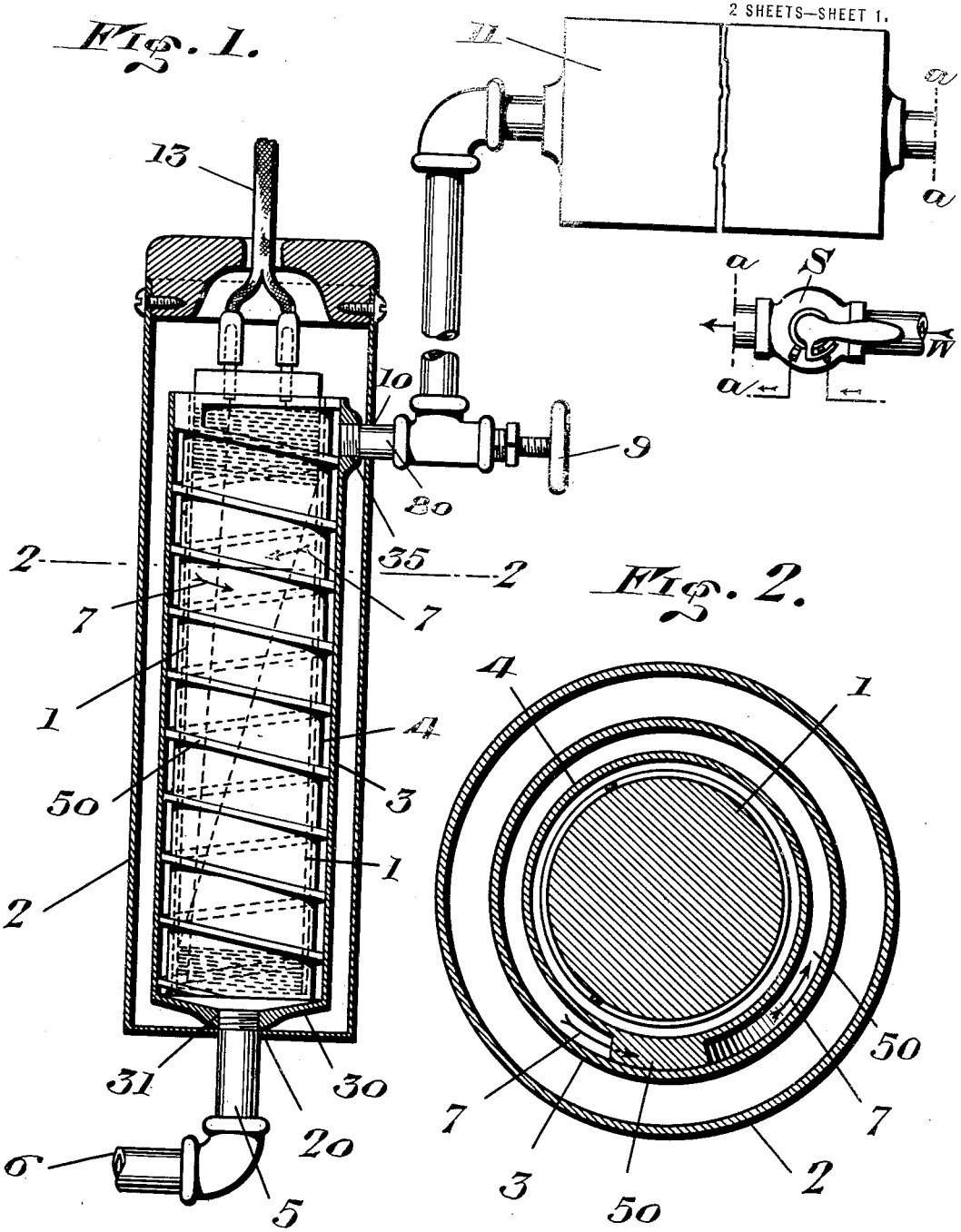

UNITED STATES PATENT OFFICE.

CHARLES D. McLEAN, OF BERLIN, NEW HAMPSHIRE, ASSIGNOR OF ONE-THIRD TO THEODORE MORIN AND ONE-THIRD TO PETER E. LEMIEUX, BOTH OF BERLIN, NEW HAMPSHIRE.

INSTANTANEOUS HEATER.

1,355,838.  Specification of Letters Patent.  Patented Oct. 19, 1920.

Application filed September 22, 1919. Serial No. 325,404.

*To all whom it may concern:*

Be it known that I, CHARLES D. McLEAN, a citizen of the United States, residing at Berlin, in the county of Coos and State of New Hampshire, have invented a new and Improved Instantaneous Heater, of which the following is a specification.

This invention has reference to improvements in that class of water heating appliances in which electrically energized cartridge heating units are utilized for effecting a quick heating of the water that passes in contact therewith, and my said invention primarily has for its object to provide an electric water heating appliance of the general character referred to of a simple and economical construction, that can be readily and with little expense installed in the water supply pipe and which is effective and practically instantaneous in its action.

Another object of my invention is to provide in a water heating appliance means for effecting a reserve water supply to the heating element after the regular water supply and the electric current is shut off, whereby to prevent the heater, which remains hot for some time after the water supply is cut off, from generating steam with what water would be left in contact with the said heating elements.

With other minor objects in view and hereinafter apparent, my invention is an improved electric water heating appliance which embodies the peculiar features of construction and novel arrangement of parts, all of which will be fully stated in the following detailed description, specifically pointed out in the appended claims and illustrated in the accompanying drawings, in which:—

Figure 1 is a vertical section of a single unit water heater constructed in accordance with my invention, parts being in side elevation.

Fig. 2 is a horizontal section thereof on a somewhat enlarged scale and taken on the line 2—2 of Fig. 1.

Fig. 3 is a diagrammatic side elevation of a three unit heater embodying my invention.

Fig. 4 is a diagrammatic plan view of an assembled set of three heating units within an outer casing.

In carrying out my invention, I employ a conventional or standard type of cartridge heating unit 1, which in my construction of a complete single unit heater is mounted within an outer casing 2 whose function is to insulate the heating element from radiation.

The heating element 1, as is clearly shown in Figs. 1 and 2, includes an outside water jacket 3 and an inner water jacket 4, the latter being located within the outer jacket 3 and is mounted, at its lower end, on the dished bottom 30 of the said outer jacket 3 and which has a screw tap 31 for receiving a connection 5 that passes through a passage 20 in the casing 2 and joins with an elbow that couples with the water offtake pipe 6 as is shown in Fig. 1, by reference to which it will also be observed that the heating cartridge or unit 1 is held within and extends the full length of the inner water jacket 4.

One of the water jackets 3 or 4, preferably the jacket 4, is formed with barriers in the nature of a spiral flange 50 that spurls around and between the two jackets 3 and 4 to cause the water to flow in a retarded passage around the heater as designated by the arrows 7—7 on Fig. 1, it being understood that the water supply enters at the top of the space between the two jackets through the inlet pipe 80 whose discharge is controlled by a needle valve 9.

The pipe 80 passes through an aperture 10 in the outer casing and connects with a screw tap 35 in the outer water jacket 3.

11 designates a reservoir, in practice, located in the main water supply pipe. The purpose of the said reservoir is to maintain a supply of water sufficient for creating a water flow through the heating element after the water and electric supply is cut off and thereby keep the heater from generating steam with what water would be left in it, the supply tank being sufficiently large to maintain a flow of water through the heater necessary to cool it.

For larger sizes, my improved heater may embody a plurality of heater units three, for example, as shown in Figs. 3 and 4.

When a plurality of heating elements are used, the heating units are connected in multiple and the waterways in series, as shown in Fig. 3, and the several heating units held within a single casing 2, as in Fig. 4.

Each complete heating unit includes a wooden cap that closes the top of the outer casing 2 and which is centrally apertured for the cord 13 that goes to the terminals on the heating unit or cartridge 1, as clearly shown in Fig. 1.

In the practical application of my heating appliance the main water supply is preferably equipped with an electric snap switch S of any approved form and which latter, at the same time, when properly adjusted, turns the water and the electric current on when using the heater and turns both off again when through using them.

From the foregoing description taken in connection with the accompanying drawings, the complete arrangement, the manner of use and the advantages of my special construction of water heater will be readily apparent to those familiar with the installation and use of appliances of this kind.

The needle valve 9 before referred to, in practice, will be so constructed that it will not entirely shut off the water supply but will allow enough water to flow through the heater, at all times, (when the main switch valve is open) to keep the heater from burning up, should the electric current be turned on at some time when the needle valve is shut tight and the heater thereby gets an electric current.

What I claim is:

1. In a heater of the character described, a heating cartridge, a water container, comprising outer and inner jacket shells, means for suspending the cartridge within the inner shell, a water inlet and an outlet in connection with the outer shell and a means for concentrating the radiating heat around the said outer shell.

2. In a heater of the character described, a heating cartridge, a water container comprising outer and inner jackets, means for suspending the cartridge within the inner jacket, a water inlet and an outlet in connection with the outer jacket and a means for concentrating the radiating heat around the said outer jacket, the said means comprising a casing apertured at the upper and lower ends for the water intake and outlet connections and having a supplemental opening in the top for the reception of the electrical connections to the heating cartridge.

3. In a heater of the character described, an electrically energized heating cartridge, inner and outer spaced jacket shells, means for suspending the cartridge within the inner shell, means for connecting the spaces between the outer and inner shells with the water supply pipe, a barrier contained within the space between the outer and inner shells for creating a spiral movement to the water as it passes through the heater.

4. An electric heater of the character described comprising in combination with an electrically heated cartridge which includes an incasing jacket means directing the water in the supply pipe against the said jacket as it passes through the heater, and a supplemental water supply for continuing the water flow through the heater after the heating means and the main water supply are cut out.

5. An electric heater of the character described comprising in combination with an electrically heated cartridge which includes an incasing jacket means directing the water in the supply pipe against the said jacket as it passes through the heater, and a supplemental water supply for continuing the water flow through the heater after the heating means and the main water supply are cut out, the said means comprising a reservoir in the main supply pipe to the heater and a water and current cut out switch valve in the said water supply and the heating circuit.

6. An instantaneous heater of the character described, comprising an inner and an outer shell, the said shells being spaced apart to provide an intervening water space, an electrically heated cartridge, means for suspending the said cartridge within the inner one of the said shells, a water inlet connection that joins the upper end of the outer shell with the water supply pipe, a water outlet connection that joins the lower end of the shell with the said supply pipe, the inner shell having external spirally arranged barriers to cause a spurling action to the water as it passes through the heater from the inlet to the outlet end thereof, and means for insulating the heating element from radiation.

7. An instantaneous heater of the character described, comprising an inner and an outer jacket, the said jackets being spaced apart to provide an intervening water space, an electrically heated cartridge, means for suspending the said cartridge within the inner one of the said jackets, a water inlet connection that joins the upper end of the outer jacket with the water supply pipe, a water outlet connection that joins the lower end of the jacket with the said supply pipe, the inner jacket having external spirally arranged barriers to cause a spurling action to the water as it passes through the heater from the inlet to the outlet end thereof, and means for insulating the heating element from radiation, the said means comprising an outer casing having an inlet through the upper end for the water infeed connection to the heater and an opening in the bottom for the water outfeed to the service pipe, the said casing including a cap apertured for the passage of the electric circuit connections that joins with the heating cartridge.

8. An instantaneous heater of the character described, comprising an inner and an outer jacket, the said jackets being spaced apart to provide an intervening water space, an electrically heated cartridge, means for suspending the said cartridge within the inner one of the said jackets, a water inlet connection that joins the upper end of the outer jacket with the water supply pipe, a water outlet connection that joins the lower end of the jacket with the said supply pipe, the inner jacket having external spirally arranged barriers to cause a spurling action to the water as it passes through the heater from the inlet to the outlet end thereof, and means for insulating the heating element from radiation, the said means comprising an outer casing having an inlet through the upper end for the water infeed connection to the heater and an opening in the bottom for the water outfeed to the service pipe, the said casing including a cap apertured for the passage of the electric circuit connections that joins with the heating cartridge, and other means for maintaining a reserved water supply for feeding to the heater after the main service pipe and the electric heating element for the cartridge are cut out, whereby to cool the heater and avoid steam generation from the water contained within the heater after the main supply is cut out.

CHARLES D. McLEAN.